Nov. 6, 1945.   G. WÜNSCH   2,388,512
REGULATING DEVICE FOR STEAM GENERATORS
Filed March 28, 1940
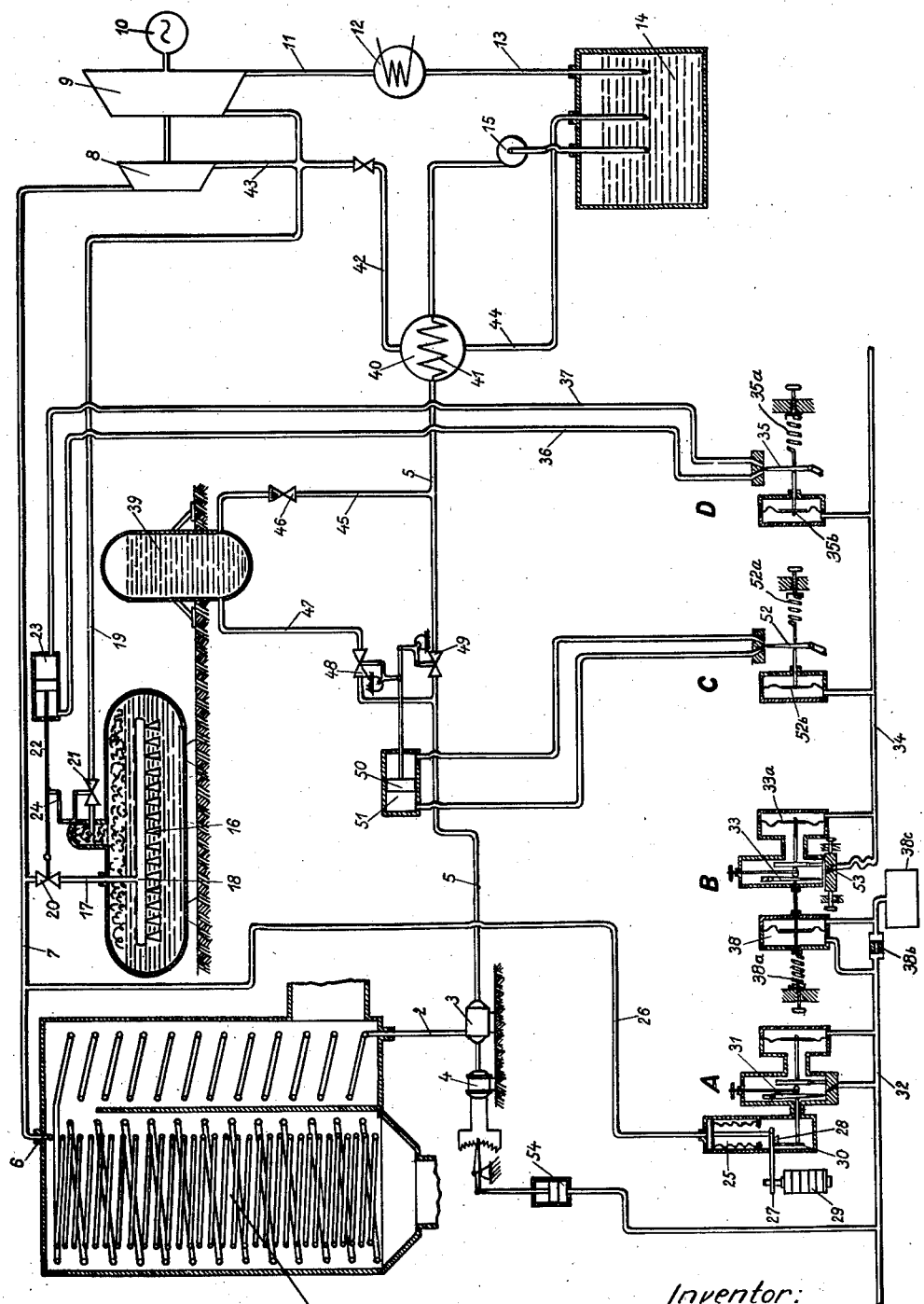
Inventor:
Guido Wunsch
By A D Adams
Atty.

Patented Nov. 6, 1945

2,388,512

UNITED STATES PATENT OFFICE 2,388,512

REGULATING DEVICE FOR STEAM GENERATORS

Guido Wünsch, Berlin-Wannsee, Germany; vested in the Alien Property Custodian

Application March 28, 1940, Serial No. 326,527
In Germany March 8, 1939

4 Claims. (Cl. 122—35)

This invention relates to improvements in vapor power plants and more particularly to plants of the type comprising a vapor generator and means for storing energy to relieve said generator with respect to the generator load changes.

The main object of the present invention is to provide means for increasing the adaptability of the generator in regard to load changes.

A further object of the invention is to eliminate the disadvantages of the storing devices hitherto known.

Other aims, objects and advantages of the invention will appear from the following description in connection with the drawing showing by way of example only one embodiment of the present invention.

This drawing schematically represents a vapor power plant comprising a once-through vapor generator, a steam accumulator, a preheated liquid accumulator and controlling means for controlling the charging and discharging of said accumulators in response to the generator load changes.

The present invention deals with the following problem. Frequently a generator needs to possess great adaptability in order to follow load changes inasmuch as it would have to adjust itself instantaneously to the new value in the case of rapid load changes. Mostly this is not possible in practice. If the load were to increase rapidly from, say, 50% to 100%, the supply of heat—to take one of the essential factors in the operation of a generator—for instance, would immediately have to be doubled. Experience proves, however, that a certain minimum space of time has to be reckoned with for this increased supply to become effective and hence for the steam production likewise.

This difficulty in steam generator operation is more particularly noticeable in generators of small water content, for instance in once-through vapor generators. The adaptability of the latter is further limited inasmuch as the storing capacity on the one hand, on account of the inconsiderable water content in comparison with that of (drum) boilers, is considerably less and further by the fact that the delay in the water circulation in pipe generators impairs their adaptability to load fluctuations. When the load changes rapidly, the effective superheater surface changes in an undesirable manner resulting in considerable temperature fluctuations in the super-heated steam even if the absolute change in the load is comparatively small.

In order to reduce the reaction of the load changes to the generator, it is known to provide a vapor accumulator for storing vapor upon any decrease in the generator load and for discharging the stored-up vapor upon an increase in the generator load with respect to a predetermined load value. The well known power plants of this type are provided with controlling means which operate in response to the load change, i. e. the deviation of the actual load from said predetermined load value. To this end the controlling means are made to be responsive to the absolute steam pressure variations or steam quantity variations in the main steam line caused by the load changes. With such control, the vapor accumulator becomes effective only to a small extent if the absolute load variation is slight, and in this respect it is to be noted that the reaction of the load changes to the generator is not only dependent on the load variation per se, but also on the rate at which the variation occurs. Therefore, the reaction may be considerable if said variation occurs rapidly. It is to be borne in mind that a certain amount of time is necessary for the generator to follow a load change. Thus, for instance as experience has taught, a once-through vapor generator must not be exposed to a greater load change than 10% per minute. Therefore due to its limited adaptability to load changes the generator requires a certain length of time for responding to these changes. In the event of the load variation per se being slight while the load variation velocity exceeds the value referred to above, the generator in following the load changes will lag more or less behind the actual rate of load change. On the other hand, the vapor accumulator controlled according to the pressure variations will relieve the generator to the same extent regardless of the velocity of the load variation. Obviously the relief action on the part of the accumulator, while sufficient at slight load variation velocities, in the case of great velocities of load changes must be inadequate for protecting the generator. For this reason adequate protection cannot be obtained either by means of an accumulator controlled merely in response to the load variation per se.

Now if the generator is not sufficiently relieved by the vapor accumulator, more time is required for the generator to attain the requisite new load condition. Accordingly the accumulator must be adapted to remain effective for a correspondingly longer period, i. e. the accumulator should possess a greater storing capacity.

The present invention is based on the conception that these difficulties may be overcome by controlling the storing means in response to the load variation velocity. In this way the generator will be effectively relieved upon rapid load changes. Furthermore the time required for the generator to attain the requisite new load condition will be reduced.

The single figure of the drawing illustrates an embodiment of the invention.

Referring now to the drawing, 1 is a once-through vapor generator, the liquid receiving end of which communicates by means of a supply conduit 2 with a supply pump 3 driven by an electric motor 4. The pump 3 delivers the feed water from a conduit 5. The vapor produced by the generator 1 leaves the generator passage at 6 and enters a main steam conduit 7 leading to any steam consumption apparatus shown to be a steam turbine comprising a high pressure stage 8 and a low pressure-stage 9, said turbine being provided in the embodiment shown for driving a dynamo 10. The waste steam from said low pressure stage 9 enters a conduit 11 and passes a condenser schematically shown at 12. The condensed steam flows through the conduit 13 into a reservoir 14. A pump 15 driven in any convenient manner is provided for delivering the liquid from said reservoir 14 into the feed water conduit 5 above referred to.

For relieving the generator 1 with respect to any load changes, a steam accumulator 16 of the well known type is provided, said accumulator containing liquid to be vaporized by means of the steam coming from the main conduit 7. To this end a steam charging conduit 17 branches off from the conduit 7 and leads to a steam divider 18. A steam discharging conduit 19 communicates with the low pressure stage 9 of the steam consumption apparatus. In distinction from a communication of the conduit 19 with the high pressure stage 8 a greater pressure drop is available between the steam accumulator 16 and the consumption apparatus, so that the discharging capacity of the accumulator will be increased in comparison with the action of the discharging conduit 19 to the high pressure stage 8.

The charging conduit 17 and the discharging conduit 19 are each provided with a valve 20, 21, respectively. These valves are operatively connected—as shown in the drawing—so as to be inversely controlled. A piston rod 22 of a servomotor 23 is linked to the connecting rods 24 for automatically controlling said two valves in response to the load variation velocity.

In the following the means for deriving a corresponding controlling impulse are dealt with singly.

In the embodiment shown, in the first instance a load impulse will be produced by means of a device shown in its entirety at A. This device comprises a bellows 25 acted upon by the same pressure as exists in the main conduit 7. For this purpose a pressure conduit 26 leads from the main conduit 7 to the bellows 25. The bellows 25 act upon one end of a lever 27 supported by an edge 28, at the other end of which a weight 29 is suspended for balancing the force exerted by the bellows.

In the position shown in the drawing the force exerted by the bellows 25 is in equilibrium with the moment exerted by the weight 29 on the lever 27. As soon as the pressure in the conduit 26 increases as a result of a load decrease, the lever 27 will be moved clockwise about the edge 28. An arm 30 fastened to the lever 27 moves in the same sense so that the jet pipe 31 of a well known Askania jet pipe relay A deflects clockwise. As a result of this jet pipe deflection the pressure in the receiving nozzle of the jet pipe relay communicating with a controlling pressure conduit 32 decreases in accordance with the load decrease. If on the other hand the pressure in the conduit 26, i. e. on the bellows 25, decreases as a result of a load increase, the lever 27 and the arm 30 are caused by the weight 29 to move counterclockwise thereby deflecting the jet pipe 31 to the right so that the pressure in the receiving nozzle and in the conduit 32 will be increased in response to the load increase.

From the foregoing it follows that the relay A produces in the controlling pressure conduit 32 a pressure which positively follows the load variations of the steam generator.

For deriving a rate of change impulse from the load change impulse in the conduit 32 an additional device is provided shown as a whole at B. The pressure responsive relay B includes a diaphragm 38 which can be adjusted by a compression spring 38a. It is subjected on its left hand side to the pressure existing in the conduit 32 and on its right hand side to the pressure existing on the opposite side of a restriction 38b which is connected to a closed air chamber 38c. The diaphragm 38 operates a jet pipe 33 in response to sudden increases in the boiler load, moving the jet pipe toward the right so that it will register with a receiving orifice 53 leading into the pipe 34. The receiving orifice plate 53 is shown as being adjustable so that it can be set to correspond to different rates of load change.

It will be understood that the rate of change in the load employs the well known idea of charging the chamber 38c, located beyond the restriction 38b, with the expansible pressure fluid. It is necessary to pass air through the restriction 38b in order to build up the pressure in the chamber and, inasmuch as this pressure is proportional to the amount of fluid in the chamber, the pressure drop across the restriction 38b is directly proportional to the rate of change of the fluid pressure in the chamber, or directly proportional to the rate of pressure change or increase. The relay B does not respond to a slow rate of load change. It is obvious that in the case of a slow rate of load change the air can get through the restriction 38b quickly enough to build up a balancing pressure on the right hand side of the diaphragm 38 to prevent effective movement of this diaphragm toward the right which is necessary to bring about functioning of the relay B. However, even though the rate of load change may not be sudden enough to operate the relay B, such slow change can nevertheless operate the relay A to appropriately control the action of the pump 3.

A jet pipe relay D is operatively connected to the conduit 34 and provided for controlling the servo-motor 23. A jet pipe 35 of the relay D cooperates with two receiving nozzles, each of which communicates with a conduit 36, 37, respectively, leading to the servo-motor 23, as may be seen from the drawing.

These conduits are closed and preferably filled with air or some other expansible fluid at atmospheric pressure. The jet pipes 31 and 33 of the relays A and B are supplied with air at constant pressure, and the pressure in the chambers of these relays is also atmospheric. When the jet pipes register with their respective receiving orifices leading to the conduits 32 and 34, it is clear that the air pressure is built up in these conduits.

When the jet pipes are restored to the positions shown in the drawings, the pressures in the conduits 32 and 34 will be restored to atmospheric pressure, it being understood that the casings of both relays are vented to the atmosphere.

A sudden overload or increase in boiler load will cause a drop in pressure in the pipe 26 which is connected to the pipe 7. If the drop is sudden enough it will permit the weight 29 to expand the bellows 25 against reduced pressure in the bellows chamber. The jet pipe 31 is thereby moved toward the right into registry with the orifice leading into pipe 32. The pressure thus built up in pipe 32, if fast, will then tend to balance the pressure on the right hand side of the diaphragm 38. If, however, the build up of pressure in pipe 32 is slow, the pressure can get through the restriction 38b quickly enough to build up a balancing pressure relative to the diaphragm 38, which prevents operation thereof. In other words, while the present device may be adjusted to respond to quick rates of load change and to small and large rates of change, it is not responsive to slow rates of load change.

The operation of the device described is as follows: Be it assumed that the load increases; the pressure in the main conduit 7 will then decrease so that the lever 27 of the device A will be rocked in an anticlockwise manner. Accordingly the jet pipe 31 will be likewise deflected in an anticlockwise manner thereby increasing the pressure in the conduit 32 in accordance with the load increase. The increased pressure in 32 thus produced acts upon the left side of the diaphragm 38 of the device B, whilst the pressure on its right side is a function of the velocity of the load change. Therefore, the jet pipe 33 varies the pressure in the conduit 34 in accordance with the increase in the rate of load change, so that by means of the relay D the servo-motor 23 closes the charging valve 20 and simultaneously opens the discharging valve 21 in dependence on the rate of load change. Accordingly in case of a great rate of load change the two valves 20 and 21 will be more strongly influenced than in the case of a slight rate of load change.

In addition to the steam accumulator 16 a preheated liquid accumulator 39 is provided according to the embodiment shown in the drawing. This liquid accumulator is arranged to likewise relieve the generator in such a manner that upon a load increase the accumulated preheated liquid in 39 will be additionally supplied to the generator whilst upon a load decrease the surplus of preheated feed liquid will be stored in 39.

For preheating the feed liquid delivered by the pump 15 into the feed conduit 5, a preheater 40 is provided comprising a heat exchanging element 41 arranged in a casing or housing through which passes the steam coming from the medium pressure stage of the steam consumption apparatus. Accordingly the steam conduit 42 leading to the preheater 40 branches off from a conduit 43 leading from the high pressure stage 8 to the low pressure stage 9. The steam condensed in 40 flows through conduit 44 to the reservoir 14 above referred to. The preheated liquid leaving the preheater 40 flows through conduit 5 to the generator as long as the accumulator 39 remains inoperative. For accumulating the preheated liquid in 39 upon a load decrease, a conduit 45 branches off from the conduit 5 and communicates with 39. The conduit 45 comprises a check valve 46 for preventing a return flow from 39 through 45. A discharge conduit 47 communicates with conduit 5 via a valve 48 behind a valve 49 inserted in the conduit 5 between the conduit 45 and the discharge conduit 47. The two valves 48 and 49 are operatively connected to the piston 50 of a servo-motor 51 so as to be inversely controlled in a similar manner as the valves 20 and 21 of the steam accumulator 16. For controlling the servo-motor 51 another relay device C is provided and—similar to the device D—connected to the controlling pressure conduit 34 so that the servo-motor 51 controls valves 48 and 49 in dependence on the rate of load change in a manner similar to that according to which the servomotor 23 controls the valves 20 and 21.

The preheated liquid accumulator 39 operates as follows: Upon a load increase the pressure in the main conduit 7 decreases so that, as described above, the controlling pressure in 34 varies in accordance with the rate of load increase. Therefore the jet pipe 52 of the relay device C deflects (like the jet pipe 35 of the relay device D) in a clockwise manner so that the piston 50 of the servo-motor 51 will be displaced to the left, thus closing the valve 49 and simultaneously opening the valve 48. In this way the preheated liquid in 39 flows through the discharge conduit 47 into the feed conduit 5 to the pump 3 delivering the liquid into the generator. If, however, the generator load decreases, the piston 50 of the servo-motor 51 will be displaced to the right thus causing the opening of the valve 49 and simultaneously the closing of valve 48. In this case the liquid delivered by the pump 15 flows through the valve 49 as well as into the accumulator 39. Due to the reduced load the generator receives only a reduced amount of feed liquid, the motor 4 for driving the supply pump 3 being controlled in response to the generator load by means of a servo-motor 54 as more fully explained below, so that a considerable part of the liquid delivered by the pump 15 enters the accumulator 39, the discharge of which is reduced or stopped. Under these circumstances the preheater 40 receives a greater amount of preheating steam coming from the steam consumption apparatus, i. e. the surplus not consumed by said apparatus due to the load decrease.

In some cases it may be desirable to control the accumulators in response to the rate of load change in such a manner that the generator will only be relieved when the rate of load change exceeds a predetermined value. This value depends on the generator characteristic determining the range of the rate of load change within which the generator does not require any relief by means of any accumulator. As mentioned above, a once-through vapor generator as shown in the drawing may follow a rate of load change of within 10% per minute. With this in view, the invention aims at providing auxiliary means for rendering inoperative the controlling system within said predetermined value whereby said accumulators merely relieve the generator upon a load change exceeding said value.

In the embodiment shown, a receiving nozzle 53 may for this purpose be transversely displaced in any suitable manner in order to vary the controlling pressure in the conduit 34 in response to the position of the jet pipe 33. As will be readily understood, the smaller the lateral distance of the receiving nozzle 53 from the nozzle of the jet pipe 33 in the position shown in the drawing, the smaller will be the jet pipe deflection necessary for producing a predetermined controlling pressure in 34. Accordingly, due to a lateral displacement of the receiving nozzle to the right, the same deflection of the jet pipe results in a smaller controlling pressure in 34. Therefore the pressure in 34 is a function of the lateral displacement or distance above referred to. In this manner by such displacement it may be achieved that the pressure in 34 does not vary upon slight deflections of the jet pipe 33 corresponding to slight rate of load changes but only upon deflection resulting from a rate of load change exceeding a predetermined minimum load value as for instance 10 per cent per minute. In this way the accumulators do not become effective in response to all load changes and thus comparatively slight stored up energies suffice for the desired relief of the generator.

As may be seen from the drawing, the position of the receiving nozzle 53 may be adjusted at will so that the controlling system may be easily adapted to the working condition of the entire plant.

It is to be noted that, in distinction from the embodiment shown, only one of the two accumulators 16 and 39 may be provided. Furthermore it would be possible to modify the embodiment shown in such a manner that the two accumulators do not operate simultaneously but in series. In the embodiment shown the two relays C and D operate simultaneously in response to the rate of load changes so that the two servo-motors 51 and 23 and accordingly the two accumulators 16 and 39 will be likewise controlled simultaneously. If it is desired to have the two accumulators operate in series, it is only necessary to provide means for rendering operative the two relays C and D one after the other. For this purpose for instance one of the two jet pipe relays C and D may be provided with displaceable receiving nozzles similar to that of the relay B as described above.

The accumulators may be controlled in response to the rate of load change as well as to the load change per se. The inventive principle consists merely therein that the accumulators in all events operate in response to the rate of load change. The manner in which the rate of load change impulse is derived is immaterial. Therefore the device B may be replaced by any other convenient means. Thus for instance a gyroscope might be used whose axis of rotation would be displaced in accordance with the load change impulse per se in such a manner that the rate of load change impulse could be obtained from the gyroscope precession moment as for instance shown and described in the patent application Ser. No. 159,013 filed August 13, 1937.

For the sake of completeness it may be further submitted that any load change impulse for controlling the plant may be derived from the controlling pressure conduit 32. For instance a servomotor 54 for controlling the electric motor 4 driving the pump 3 in response to the load change may be connected to the conduit 32.

It will be understood by those skilled in the art that the pistons in the control cylinders 23, 50 and 54 should be provided with suitable compression or balancing springs to maintain the pistons in definite neutral or starting positions. The hot water accumulator acts to store hot water supplied by the pump 15 through the check valve 46 and builds up air pressure and air pressure is built up in the accumulator when the boiler is operating a low load. The air is compressed in the accumulating chamber 39 and, when the valve 48 is opened, the water is delivered under high pressure to the intake of the pump 3, thereby increasing the feed water supply in response to sudden increases in boiler load.

While I have described and illustrated my invention by a special embodiment shown in the drawing, it will be readily understood by those skilled in the art that the description is not to be taken in a limiting sense, many modifications of the embodiment shown—apart from those mentioned above—being possible within the scope of my invention. Moreover it is not indispensable that all the features of my invention be used jointly since they may be employed advantageously in various combinations and sub-combinations without departing from the spirit of the invention as defined in the appended claims.

What is claimed is:

1. In a vapor power plant a vapor generator having a once-through fluid passage receiving liquid at one end and delivering vapor at the other end, a pump connected to supply liquid to the generator a liquid accumulator also connected to receive liquid from the supply pump for relieving said generator during changes in load on the generator by storing pre-heated liquid and discharging it into the receiving end of said passage due to an increase in the generator load, controlling means responsive to the rate of generator load changes for controlling the charging and discharging of said liquid accumulator.

2. In a vapor power plant a vapor generator having a once-through fluid passage receiving liquid at one end and delivering vapor at the other end, a main vapor conduit communicating with said last named passage end, a pump connected to supply liquid to the generator an accumulator for storing vapor so as to relieve said generator with respect to generator load changes, an input conduit for delivering vapor into said accumulator connected to said main vapor conduit and including a valve responsive to load changes and an output conduit for discharging the vapor stored in said accumulator, said input conduit communicating with said main conduit, controlling means responsive to the rate of the generator load changes for controlling the charging and discharging of said accumulator.

3. In a vapor power plant a vapor generator having a once-through fluid passage receiving liquid at one end and delivering vapor at the other end, a main vapor conduit communicating with said last named passage, an accumulator for storing vapor so as to relieve said generator with respect to the generator load changes, an input conduit for delivering vapor into said accumulator and an output conduit for discharging vapor stored in said accumulator, said input conduit communicating with said main conduit, an inflow controlling valve in said input conduit and an outflow controlling valve in said output conduit, controlling means responsive to the rate of the generator load changes, said two valves being operatively connected to said controlling means so as to be controlled inversely in response to the rate of the generator load changes.

4. In an apparatus for automatically controlling a vapor power plant having a vapor generator and means for storing vapor to relieve said generator with respect to generator load changes, including an accumulator connected to receive excess steam from the generator in response to decreases in the boiler load controlling means responsive to the rate of generator load changes for controlling the charging and discharging of said storing means, and auxiliary means for rendering inoperative said controlling means within a predetermined range of the rate of load changes, whereby said storing means merely relieves said generator upon a load change exceeding said predetermined range, and additional means for adjusting said predetermined range at will.

GUIDO WÜNSCH.